US011331829B2

(12) United States Patent
Roberts et al.

(10) Patent No.: US 11,331,829 B2
(45) Date of Patent: May 17, 2022

(54) ROTATED CONCRETE VOLUME DETERMINATION

(71) Applicant: GCP Applied Technologies Inc., Cambridge, MA (US)

(72) Inventors: Mark F. Roberts, North Andover, MA (US); Nathan A. Tregger, Northborough, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 13 days.

(21) Appl. No.: 16/942,972

(22) Filed: Jul. 30, 2020

(65) Prior Publication Data

US 2021/0031407 A1 Feb. 4, 2021

Related U.S. Application Data

(60) Provisional application No. 62/881,583, filed on Aug. 1, 2019.

(51) Int. Cl.
*B28C 5/42* (2006.01)
(52) U.S. Cl.
CPC ............ *B28C 5/422* (2013.01); *B28C 5/4231* (2013.01); *B28C 5/4237* (2013.01); *B28C 5/4272* (2013.01)
(58) Field of Classification Search
CPC ..... B28C 5/422; B28C 5/4272; B28C 5/4237; B28C 5/4231; B28C 7/024; B28C 7/026;
(Continued)

(56) References Cited

U.S. PATENT DOCUMENTS 2,324,304 A 7/1943 Katzman
2,999,381 A 9/1961 Chope et al.
(Continued)

FOREIGN PATENT DOCUMENTS

EP 1961538 8/2008
WO 2016023119 2/2016
(Continued)

OTHER PUBLICATIONS

Young, Form PCT/ISA/220, International Search Report for PCT/US2020/044153, Dated Oct. 15, 2020, 2 pages.
(Continued)

*Primary Examiner* — Charles Cooley

(57) ABSTRACT

Volume of a concrete mix load in a rotatable mixer drum is determined using an in-and-out sensor probe system wherein the probe submerges into and exits from the concrete during mixer drum rotation and provides data to a processor used in the system for calculating volume of the concrete mix load based on the data. To take into consideration any concavity, convexity, and/or cascading surface flow effects that can hinder accurate determination of the concrete load volume, the processor is configured to compare original batch volume and rheology of the concrete load monitored during drum rotation. The calibration of load volume involves a comparison between real-time data and historic data stored in processor-accessible memory, and further take into account the speed and tilt of the mixer drum (such as caused by roadway conditions), the concrete mix design, and other factors.

15 Claims, 7 Drawing Sheets

(58) Field of Classification Search
CPC . B28C 7/022; G01N 2011/0046; G01N 11/14
See application file for complete search history.

(56) References Cited

U.S. PATENT DOCUMENTS

| | | | |
|---|---|---|---|
| 4,104,584 A | 8/1978 | Miyai et al. | |
| 4,263,511 A | 4/1981 | Hirschberg | |
| 4,438,480 A | 3/1984 | Chambaz et al. | |
| 4,780,665 A | 10/1988 | Mitchell | |
| 5,713,663 A * | 2/1998 | Zandberg | B28C 7/0454 366/8 |
| 6,042,258 A * | 3/2000 | Hines | B28C 7/024 366/8 |
| 7,033,321 B1 | 4/2006 | Sarvazyan | |
| 8,020,431 B2 * | 9/2011 | Cooley | B28C 5/422 73/54.03 |
| 8,118,473 B2 * | 2/2012 | Compton | B28C 5/422 366/17 |
| 8,311,678 B2 | 11/2012 | Koehler et al. | |
| 8,491,717 B2 | 7/2013 | Koehler et al. | |
| 8,727,604 B2 * | 5/2014 | Compton | B28C 7/12 366/61 |
| 8,727,608 B2 | 5/2014 | Blakeley | |
| 8,746,954 B2 * | 6/2014 | Cooley | B28C 5/4275 366/54 |
| 8,764,272 B2 * | 7/2014 | Hazrati | G01N 33/383 366/2 |
| 8,764,273 B2 * | 7/2014 | Koehler | C04B 40/0032 366/8 |
| 8,764,954 B2 | 7/2014 | Wang et al. | |
| 8,818,561 B2 * | 8/2014 | Koehler | G01N 11/00 700/265 |
| 8,858,061 B2 * | 10/2014 | Berman | B28C 7/02 366/10 |
| 8,960,990 B2 * | 2/2015 | Koehler | G05D 21/02 366/61 |
| 8,989,905 B2 * | 3/2015 | Sostaric | B28C 7/02 700/265 |
| 9,199,391 B2 | 12/2015 | Beaupre et al. | |
| 9,466,203 B2 | 10/2016 | Jordan et al. | |
| 9,550,312 B2 | 1/2017 | Roberts et al. | |
| 9,625,891 B2 | 4/2017 | Berman | |
| 9,789,628 B2 * | 10/2017 | Chun | B28C 7/12 |
| 9,789,629 B2 * | 10/2017 | Koehler | C04B 40/0032 |
| 9,952,246 B2 | 4/2018 | Jordan et al. | |
| 10,041,928 B2 | 8/2018 | Berman | |
| 11,130,714 B2 * | 9/2021 | Tregger | C04B 40/0032 |
| 11,224,989 B2 * | 1/2022 | Beaupre | B28C 5/4244 |
| 2007/0185636 A1 * | 8/2007 | Cooley | B28C 7/12 701/50 |
| 2008/0316856 A1 * | 12/2008 | Cooley | B28C 5/4275 366/142 |
| 2009/0037026 A1 * | 2/2009 | Sostaric | B01F 15/00207 700/265 |
| 2011/0029134 A1 * | 2/2011 | Hazrati | G01N 33/383 700/265 |
| 2011/0077778 A1 * | 3/2011 | Berman | G05B 15/02 700/265 |
| 2011/0088599 A1 * | 4/2011 | Koyata | C04B 40/0039 106/803 |
| 2011/0320040 A1 * | 12/2011 | Koehler | B28C 7/026 700/265 |
| 2012/0016523 A1 * | 1/2012 | Koehler | G01N 11/00 700/265 |
| 2012/0204625 A1 | 8/2012 | Beaupre et al. | |
| 2013/0145967 A1 * | 6/2013 | Koehler | B29C 35/0272 106/638 |
| 2013/0272084 A1 * | 10/2013 | Koehler | C04B 40/0032 366/12 |
| 2014/0104972 A1 | 4/2014 | Roberts et al. | |
| 2014/0107844 A1 * | 4/2014 | Koehler | G05D 21/02 700/265 |
| 2015/0355160 A1 | 12/2015 | Berman | |
| 2016/0355441 A1 * | 12/2016 | Tregger | B28C 7/024 |
| 2017/0087743 A1 * | 3/2017 | Roberts | F24F 13/32 |
| 2017/0108421 A1 * | 4/2017 | Beaupre | G01N 11/10 |
| 2017/0370898 A1 | 12/2017 | Radjy et al. | |
| 2020/0262105 A1 * | 8/2020 | Tregger | B28C 5/422 |
| 2020/0402619 A1 * | 12/2020 | Tregger | G16C 20/70 |
| 2021/0031407 A1 * | 2/2021 | Roberts | B28C 5/4231 |
| 2021/0291403 A1 * | 9/2021 | Goldstein | C04B 40/0032 |
| 2021/0394394 A1 * | 12/2021 | Datema | B60P 3/16 |

FOREIGN PATENT DOCUMENTS

| | | |
|---|---|---|
| WO | 2017099711 | 6/2017 |
| WO | 2019032820 | 2/2019 |
| WO | 2019040562 | 2/2019 |

OTHER PUBLICATIONS

Young, Form PCT/ISA/237, Written Opinion of the International Searching Authority for PCT/US2020/044153, Dated Oct. 15, 2020, 6 pages.

\* cited by examiner

ROTATED CONCRETE VOLUME DETERMINATION

FIELD OF THE INVENTION

The invention relates to the field of concrete rheological measurement, and more particularly to a system and process that considers the effect of non-Newtonian fluid surface flow anomalies, such as convexity, concavity, and/or cascading, when determining volume of concrete using an entry/exit probe inside a rotating mixer drum.

BACKGROUND OF THE INVENTION

It is known to use probes mounted upon an inner surface of a concrete mixer drum to determine a rheological property as well as the volume of a concrete mix contained within a rotating mixer drum.

In U.S. Pat. No. 9,199,391 of I.B.B. Rheologie Inc., Beaupre et al. disclosed a probe having a resistance member for sensing pressure imparted by concrete when the probe, mounted on the inner wall of a rotating mixer drum, was submerged into and moved within the concrete by the rotation of the drum. Rheological properties were reflected by resistance in the concrete as sensed by the probe at low and high speeds.

In U.S. Pat. No. 9,625,891 (owned by GCP Applied Technologies Inc.), Berman taught that a computer processor unit could be programmed to record a first interval of time that a sensor rotated and was submerged within a concrete mixture within the drum during rotation, and to record a second interval of time that the sensor was not submerged, thereby to calculate a volume of the concrete based on an analysis of the first and second intervals. Based on the calculated concrete volume, an amount of liquid could be calculated for addition into the concrete to achieve a desired rheological property. (See e.g., U.S. Pat. No. 9,625,891 at column 4, line 49 to column 5, line 14).

In U.S. Pat. No. 10,041,928 (owned by GCP Applied Technologies Inc.), Berman disclosed a sensor that took into consideration additional forces imparted by the concrete mix on the sensor; namely, by the sideways action of mixing fins mounted on the walls of the rotating drum. This improvement was premised upon the volume determination process set forth in the earlier U.S. Pat. No. 9,625,891. The process involved recording the angle that the sensor probe was submerged within the concrete in the rotating drum, recording the angle that the sensor emerged from the concrete mixture, and calculating the slump of the concrete by analyzing "submerge angle" and "emerge angle" using a conversion table or mathematical function. See e.g., column 5, line 32 to column 6, line 2.

In WO 2019/040562A1, Biesak et al. disclosed a system for sensing volume and/or viscosity of a concrete slurry contained in a rotating drum. The sensor was mounted on an inner drum wall, and could contain an acoustic transducer, accelerometer, and pressure sensor to enable a signal processor to determine angular positions and entry and exit points relative to the concrete load. It was pointed out that while low viscosity concrete slurries remain level within the drum, high viscosity concrete slurries can "ride up the wall" such that there is a "tilt" in the level of the concrete (when the drum is viewed in cross-section perspective). The amount of tilt was said to depend upon the viscosity of the concrete and the speed of rotation of the drum (See e.g., page 11 at lines 19-24; FIG. 5).

Thus, by recording the entry and exit points at which a probe enters into and exits from the concrete mix contained in the rotating mixer drum, it has been assumed up until the present time that accurate volume determinations of the concrete load were being made.

SUMMARY OF THE INVENTION

In departing from prior art assumptions, the present inventors believe that the determination of entry and exit points of an electromechanical sensor probe, with respect to a concrete slurry load contained in a rotating drum, does not in and of itself ensure accuracy of the calculated volume of a concrete load contained within the rotating drum.

The present inventors realize that viscous concrete mixes at elevated drum rotation speeds can manifest surface flow phenomena that can deceive system processors used for calculating volume and/or viscosity of concrete loads based on rotational entry and exit points of a sensor probe mounted inside the rotating concrete mixer drum.

Various concepts used for explicating the present invention are illustrated with reference to FIGS. 1-4.

FIGS. 1 and 2 are cross-section view of a concrete mixer drum 10 along its rotational axis wherein a sensor probe 14, shown in communication 16 with a processor 18, rotates into and out of the concrete load (shown at 12 and 22, respectively). A "low viscosity" concrete 12 is shown in FIG. 1; while a "high viscosity" concrete 22 is shown in FIG. 2. According to popular conception, the surface flow of the load of concrete 22 having higher viscosity (FIG. 2) displays an angular orientation as compared to low viscosity concrete 12 (FIG. 1) due to a "riding up a wall effect" as shown in FIG. 2.

In FIG. 3, however, an exemplary phenomenon is illustrated wherein the entry/exit points for a probe 14 mounted inside the rotating mixer drum 10 could be similar to those for FIG. 2, except that the flowing surface of the concrete 32 is concave when viewed along the cross-sectional perspective of the mixer drum 10. This concavity is due to higher viscosity of the concrete which is "riding up" the drum wall (in the direction of rotation), as well as due to particle interaction of the aggregates (e.g., sand, stones) within the concrete mix 32. Depending upon degree or nature of viscosity, the degree of concavity (or departure from curvature as compared to level concrete) is likely to be different at various drum speeds. Hence, a system processor used for calculating volume of the concrete based on signals received from the probe upon rotational entry and exit points can be fooled into "thinking" that the volume of concrete 32 illustrated in FIG. 3 is identical to the volume of concrete 22 illustrated in FIG. 2. The present inventors note here that the flow surface may also display convexity in some situations which could also affect volume calculations based on in-and-out sensor points.

The occurrence of cascading effects demonstrates that at some point the concrete begins to manifest flow behaviors which are a combination of non-Newtonian fluids and granular material; the behavior of the surface flow becomes affected by the movement of granular particles within the slurry. The present inventors believe that such complex behaviors need to be taken into account during volume calculations based on probe entry/exit points. While mild cascading effects might not hinder accurate concrete load volume calculation where the concrete delivery truck driver maintains a low mixer drum speed (e.g., 1 RPM), problems arise when pressures of the construction site induce the driver to rush when mixing and pouring the concrete. There are many reasons for the truck driver to rotate the mixer drum at a faster speed: for example, a requirement to rotate the drum a minimum number of times before the load can be poured; a desire to mix in water and/or chemical admixture so that the concrete load can be poured; a need to have the concrete poured sooner so that construction workers are not waiting around the construction site to finish (smoothen) the placed concrete; a desire to return to the batch plant sooner for the next delivery for the end of the work shift, etc.

FIG. 4 is an illustration of a concrete load 42 being subjected to a mixer drum 10 rotation speed where cascading effects, in the surface flow of the concrete 10 when viewed in cross-section perspective, can increasingly hinder accurate determination of concrete load volume. As shown in FIG. 4, extreme "S" curve shapes in the concrete 42 can become highly asymmetrical in nature: wherein the center of the "S" shape could shift with respect to the entry and exit points of the probe; or wherein the entry and exit points of the probe could be unevenly changed with respect to entry and exit points at a lower drum speed.

Again, the present inventors believe that calculation of concrete load volume based only upon entry and exit points of the probe can be inaccurate, given that at some point of intersection between viscosity of the concrete load and lower mixer drum speed (somewhere above 1-3 RPM), various surface flow anomalies can begin to occur.

To detect excessive concavity, convexity, and/or cascading surface flow effects which can hinder accurate calculation of a concrete load volume based on entry-exit sensor probe data, the present inventors believe that in-and-out data generated by the probe (e.g., based upon the entry and exit points, or the intervals of probe submergence and non-submergence) can be compared with in-and-out probe data previously obtained from concrete loads having the same rheology. By using a processor, in-and-out signal data for a current concrete load can be compared to historical data, and two or more factors can be considered, and used for calculation of current load volume and/or to adjust (calibrate or recalibrate) the process factors by which the volume value is obtained.

The present invention thus provides a process and system for determining and/or calibrating concrete load volume calculations based on use of in-and-out sensor probe in rotating concrete mixer drums. For example, current in-and-out data and slump values can be compared, using a processor, with stored in-and-out data and slump values to provide an associated volume value for the concrete before any portion of the load is discharged (e.g., such as the original load volume value contained on a batch ticket).

An exemplary method for determining volume of concrete, comprises: (A) rotating a concrete load contained within a mixer drum having an inner wall, a non-vertical axis of rotation, and at least one sensor probe mounted on or along the inner wall and configured to transmit in-and-out signal data when rotated through the concrete load, using (i) probe submergence and non-submergence intervals or (ii) probe entry angle and exit angles, to a processor configured to receive the in-and-out signal data and to calculate a value corresponding to volume of the concrete load; (B) the processor performing the volume value calculation by accessing a database having stored values of concrete load volumes as correlated with in-and-out signal data previously obtained from sensor probes (e.g., preferably at various drum rotation speeds); and (C) performing, based on the volume value calculation, at least one function chosen from (i) administering a dosage of water or admixture into the concrete load, (ii) expelling a volume of concrete from the mixer drum, (iii) providing an indication of the administered dosage, expelled volume of concrete, or both (e.g., delivery ticket indicating volume of concrete delivered, amount of chemical admixture dosed into the concrete); and (iv) a combination of any of the foregoing functions.

In further exemplary embodiments, the processor preferably takes into account other factors, such as rheology (e.g., slump, slump flow), angle of tilt of concrete load (as may be experienced when the delivery truck is driving up or down a sloped road surface), concrete mix design (e.g., cement content), mixer drum design, or any combination of the foregoing, in addition to different rotation speeds of the mixer drum.

An exemplary system of the present invention comprises: at least one sensor probe in communication with a processor programmed to perform the foregoing example method.

Further advantages and features of the invention will be described in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein:

FIGS. 1 and 2 are cross-sectional perspective diagrams of a rotating concrete mixer drum, wherein FIG. 1 illustrates a low viscosity concrete load and FIG. 2 illustrates high viscosity concrete load that demonstrates a "ride up the wall" effect;

DETAILED DESCRIPTION OF EXEMPLARY EMBODIMENTS

The term "concrete" as used herein may be understood to include ready-mix concrete. Typically, concrete includes hydratable cement or cementitious binder (e.g., an ordinary Portland cement, optionally with supplemental cementitious materials, such as granulated blast furnace slag, fly ash, limestone, and/or natural pozzolan) in combination with aggregates (e.g., sand, stone), water (in amounts sufficient to create a flowable or pumpable slurry), and one or more optional chemical admixtures (e.g., cement dispersants such as water-reducers called plasticizers or superplasticizers, set accelerators, set retarders, corrosion inhibitors (for metal rebar use), strength enhancers, and the like).

Figure 1:
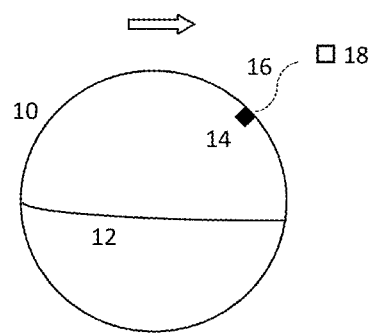
Figure 2:
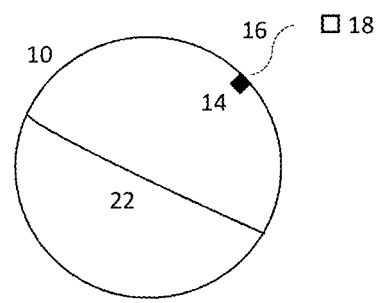

The concept of mixer "drum" can cover fixed or mobile batch mixers within concrete batch plants, or, more preferably, the rotatable mixer drums having non-vertical axis of rotation, such as found on ready-mix concrete delivery trucks. Examples of concrete mixer drums (e.g., on ready-mix trucks) having axial rotation at (a non-vertical) angle, are illustrated in U.S. Pat. No. 10,183,418 of Jorden et al. (See e.g., FIG. 1) and U.S. Pat. No. 10,041,928 of Berman (See also FIG. 1), owned by the common assignee hereof. Such mixer drums typically have at least one blade or fin mounted on the inner wall of the drum and arranged spirally around the axis of rotation, such that rotation of the drum in one direction forces concrete components towards a closed end of the drum (mixing or loading mode), while rotation in the opposite direction expels materials through the open end of the drum (pouring mode).

Exemplary sensor probes contemplated for use in the invention may include force type probes (e.g., stress or strain gauges, load cells), acoustic transducer type probes, or other electro-mechanical types which are mounted within the cavity of the drum. Preferably, the sensor probe is mounted on an inner wall of the drum, and, more preferably, it is mounted on a removable hatch lid or door in the inner drum wall. For example, U.S. Pat. No. 10,041,928 of Berman illustrates a force type sensor probe, powered by solar panel means, attached to a hatch door which is accessible from the outside of the mixer (See e.g., FIG. 1). Other force type probes were previously described in the Background section (See e.g., U.S. Pat. No. 9,199,391 of Beaupre et al.; U.S. Pat. No. 9,625,891 of Berman). An acoustic transducer type probe was also previously described in the Background section (See e.g., WO 2019/040562A1 of Biesak et al.).

A preferred sensor probe might be an on/off electrical or electronic contact switch, which closed an electric circuit (i.e., turned "on") upon entry of the probe into concrete, and which disconnected (i.e., turned "off") upon exit of the probe from the concrete. Such a design could be made much simpler as compared to the elongate, complex probe structures taught in the aforementioned patents of Beaupre et al., Berthold Berman, and Biesak et al. For example, if one were to employ a slump monitoring system that relied upon hydraulic pressure sensing, then one would not need to use a force or acoustic type sensor for determining slump of the concrete load.

Suitable sensors require the ability to distinguish between states of submergence or unsubmerged with respect to concrete, and more preferably with respect to water or slurry—such as "grey water" at the bottom of the mixer drum. "Grey water" is the term sometimes used to refer to remaining or returned concrete slurry, which may or may not be diluted with water and/or a retarding agent. For example, when the sensor comes into contact with grey water, the resulting output needs to be distinguished from the output when the sensor is not in contact with the grey water. Thus, a binary signal is suitable to determine contact with water, slurry, or other material at the bottom of the mixer drum. When submerged in grey water, sensors based on electrical resistivity will show a marked decrease in resistivity, because grey water is a conductive medium. Sensors based on electrical permittivity will show an increase in dielectric property as the sensor comes into contact with grey water. Furthermore, sensors designed to measure turbidity would measure a marked increase in turbidity as the sensor comes into contact with grey water. Suitable sensors therefore may take advantage of electrical resistance (see e.g., U.S. Pat. No. 4,780,665), electrical permittivity (see e.g. U.S. Pat. No. 4,438,480) microwaves (see e.g., U.S. Pat. No. 4,104,584), nuclear resonance (see e.g., U.S. Pat. No. 2,999,381), infrared waves (see e.g., U.S. Pat. No. 8,727,608), acoustic waves (see e.g., U.S. Pat. No. 7,033,321), light scatter (see e.g., U.S. Pat. Nos. 2,324,304 and 4,263,511), or fluid (i.e. concrete) pressure head changes (see e.g., WO 2019/040562 A1). From the signals, the submersion fraction or inverse fraction can be calculated in several ways. The disclosures of the foregoing patents are hereby incorporated by reference. It is conceivable that multiple sensors can be used to enhance the accuracy of the measurement or to provide redundancy if a single sensor malfunctions. If a redundant sensor fails, the system may detect the malfunction and switch to the alternative sensor and may also alert to the malfunction. These sensors [46 and 48] may be attached, for example, on a hatch [8] in an arrangement shown in FIG. 7. The sensors [46] and [48] in the example shown in FIG. 7 can be either the same type of sensor or they can be different. If different types of sensors are used, they may be arranged to be spaced apart to minimize any influence the sensors have on each other's measurements. If there is no interference, for example, because the sensors measure different physical phenomena, they may be spaced closer. Furthermore, such sensors may be powered by different means such as a battery (that may be rechargeable) or a solar panel, or a combination of both.

In a first exemplary embodiment, the invention provides a method for calibrating volume of concrete, which comprises: (A) rotating a concrete load contained within a mixer drum having an inner wall, a non-vertical axis of rotation, and at least one sensor probe mounted on or along the inner wall and configured to transmit in-and-out signal data when rotated through the concrete load, using (i) probe submergence and non-submergence intervals or (ii) probe entry angle and exit angles, to a processor configured to receive the in-and-out signal data and to calculate a value corresponding to volume of the concrete load; (B) the processor performing the volume value calculation by accessing a database having stored values of concrete load volumes as correlated with in-and-out signal data previously obtained from sensor probes (preferably at various drum rotation speeds); and (C) performing, based on the volume value calculation, at least one function chosen from (i) administering a dosage of water or admixture into the concrete load, (ii) expelling a volume of concrete from the mixer drum, (iii) providing an indication of the administered dosage, expelled volume of concrete, or both (e.g., delivery ticket indicating volume of concrete delivered, amount of chemical admixture dosed into the concrete); and (iv) a combination of any of the foregoing functions.

Preferably, the sensor is mounted on or along an inner wall of the mixer drum, which preferably has at least one blade or fin mounted on the inner wall in a spiral arrangement around the rotational axis of the mixer drum.

In a first aspect of the first example embodiment, the sensor probe is a contact or pressure type switch, which can sense electrical (conductive) or pressure of the concrete. For example, a contact switch which closes (turns "on") an electrical circuit when submerged in the concrete load and opens a circuit (turns "off" or disconnects) an electrical circuit when non-submerged in the concrete load, an acoustic transducer, or a combination thereof. In more preferred aspects, the contact or pressure-type switch is effective for measuring the presence of water or diluted slurry at the bottom of the mixer drum, such that this type of sensor probe can be used for measuring "grey water" which is remaining or returned concrete.

In a second aspect of this first example embodiment, the sensor probe may be a force type, having sensors that are based on the use of strain or stress gauge(s) or load cell(s) for measuring forces on the probe is rotated through the concrete load. (See e.g., U.S. Pat. No. 9,199,391 of the Beaupre, See also U.S. Pat. Nos. 8,858,061 and 9,625,891 of Berman). Such force type probes can additionally be used for monitoring slump of the concrete load.

In a third aspect of the first example embodiment, two more sensor probes could be mounted on or along the inner drum wall, or two or more sensors could be housed within the same probe body, for detecting forces in two or more directions. For example, in U.S. Pat. No. 10,041,928, Berman disclosed sensor probe devices capable of detecting flow of concrete in two different directions. One sensor could sense flow of concrete in one direction (such as in the direction of drum rotation, while another sensor could sense concrete pushed in a second direction by force of mixing blades that were moving the concrete during drum rotation.

In a fourth aspect of the first example embodiment, the sensor probe could be an acoustic transducer which generated signals that reflected or indicated state of submergence within or emergence from the concrete (See e.g., WO 2019/040562 A1 of Biesak et al.).

In a second exemplary embodiment which can be based upon the first example embodiment above, the invention provides a method wherein, in step (A), the calculation of a value for the volume of the concrete load contained in the mixer drum comprises adjustment of a concrete load volume value as included in or on a batch ticket issued by a batch plant. The adjusted volume may then, for example, be printed on a delivery ticket after the concrete is poured at a building site.

In a first aspect of this second example embodiment, the concrete load volume value is adjusted, as a result of, or as part of, the operation of calculating the current concrete load volume value. A value corresponding to the delivered concrete (e.g., the volume expelled from the drum at the building site) may be printed on a delivery ticket, which can be transmitted electronically or provided in hard copy form to a customer thereby to confirm the actual volume of concrete delivered to the building site.

In a third example embodiment which can be based upon any of the first or second example embodiments above, the invention further comprises monitoring at least one of rheology of the concrete load contained in the rotating mixer drum, tilt angle of the rotating mixer drum, or both; and performing the calculation of the volume value calculation by accessing a database having stored values of concrete load volumes as correlated with in-and-out signal data previously obtained from sensor probes, preferably at various drum rotation speeds, at various rheological conditions, and mixer drum tilt angles.

In further aspects of this third example embodiment, the rheology property being monitored can include slump, slump flow, yield stress, or other rheology property as taught in the patent literature, as mentioned herein. The tilt angle of the drum can be monitored using one or more accelerometers, such as one mounted on the rotating drum (e.g., housed next to or as part of the sensor probe), and such as one mounted on a concrete delivery truck frame, or both on the drum and truck frame. For example, an accelerometer could be installed with or as part of the sensor probe on a mixer drum hatch. Preferably, a three-axis accelerometer is used on the sensor probe, as this can enable the detection of the sensor probe entry angle and probe exit angle with respect to the concrete, and could enable detection of any drum angle as well as front to back "tilt" of the entire delivery truck, to which the mixer drum is attached, along the drum axis of rotation.

In a fourth example embodiment which can be based upon any of the first through third example embodiments above, the invention provides a method wherein the rotatable concrete mixer drum is mounted on a ready-mix concrete delivery truck. In a first aspect of this fourth embodiment, preferred truck-mounted mixer drums have a load capacity of at least 8 cubic yards of concrete, and at least two blades spirally arranged about the axis of rotation; and the axis of drum rotation is preferably between 5 to 75 degrees with respect to horizontal, and more preferably the axis of drum rotation is 10 to 55 degrees with respect to horizontal.

In a fifth example embodiment which can be based upon any of the first through fourth example embodiments above, the invention provides a method wherein the slump of a current concrete load in the mixer drum is monitored by an automatic slump monitoring system wherein the slump value is derived using a force sensor, hydraulic pressure sensor, or combination thereof.

In a first aspect of this example, a sensor probe having a stress gauge can be used to monitor the slump or other rheology properties of the concrete load over time. For example, U.S. Pat. No. 9,625,891 of Berman disclosed that a pressure sensor can be used to measure and control the slump of concrete by monitoring the sensor within the concrete mixer.

In a second aspect of this example, an automatic slump monitoring system which is based upon monitoring the hydraulic pressure (preferably by having hydraulic pressure sensors on each of the "charge" and "discharge" ports of the hydraulic motor associated with rotating the mixer drum). Concrete monitoring systems which are based on hydraulic pressure sensing as well as drum speed sensing are available, under the VERIFI® trade name, from GCP Applied Technologies Inc. and/or its affiliate Verifi LLC, 62 Whittemore Avenue, Cambridge, Mass. Such systems and their potential performance capabilities are described variously within the patent literature. See e.g., U.S. Pat. Nos. 8,118,473; 8,020,431; 8,764,954; 8,989,905; 8,727,604; See also U.S. Pat. Nos. 8,764,272; 8,960,990; 8,818,561; 8,311,678; 9,789,629; 8,491,717; 8,764,273; 9,466,203; 9,550,312; and 9,952,246.

In a sixth example embodiment which can be based upon any the first through fifth example embodiments above, the invention provides a method wherein the at least one sensor probe is a contact switch. It may be noted that exemplary aspects of this sixth example embodiment may involve using a contact switch that opens or closes a circuit when a sufficient pressure or force is exerted on the switch. Although a contact switch could be considered a basic kind of "force" sensor, the purpose of the contact switch is not so much to measure the force or pressure as to indicate emergence or non-submergence of the probe within concrete. Hence, the volume of concrete could be obtained by comparing the interval of submergence with non-submergence in the concrete, or by determining the angle of probe entry and exit (such as when an accelerometer is used in combination with the sensor probe). In further aspects of this exemplary embodiment, the switch could be used with a gyroscope and/or accelerometer, installed as a modular unit on the drum hatch door. A gyroscope and accelerometer combination taught for rotational speed sensing of concrete mixer drums was disclosed in U.S. Pat. No. 9,952,246 by Jordan et al., owned by Verifi LLC.

In a seventh example embodiment which can be based upon any of the first through sixth example embodiments above, the invention provides a method further comprising providing at least one hydraulic pressure sensor for monitoring the pressure required to rotate the concrete mixer drum at a given drum speed and obtaining an indication of slump, slump flow, or other rheology characteristic of the current concrete load in the mixer drum; and employing the at least one sensor probe to generate in-and-out data for the current concrete load contained in the mixer drum to calculate a volume value for a given drum speed, and comparing the indication of slump, slump flow, or other rheology characteristic of the current concrete load based on the hydraulic pressure and drum speed to historic signal data in which in-and-out data was stored in correlation with calculated slump, slump flow, or other rheology characteristic (preferably at various drum speeds).

In an eighth example embodiment which can be based upon any of the first through seven example embodiments above, the invention provides a method wherein the at least one sensor probe comprises a force probe and a contact switch, both of which are mounted on a mixer drum hatch door. In a first aspect of this example embodiment, the use of both a force probe and a contact switch can provide in-and-out signal data to the same processor and be compared to ascertain whether the force probe may have inaccuracies due to variations in the length of the force probe and the actual places on the concrete surface into which the force probe enters and exits.

In a ninth example embodiment which can be based upon any the first through eighth example embodiments above, the invention provides a method wherein the in-and-out probe signal data obtained from current concrete load contained in the rotating mixer drum is used by the processor only after (i) a predetermined amount of mixer drum rotations have occurred (e.g., 5, 20, or perhaps 40 rotations) or (ii) an automated slump monitoring system has confirmed that the concrete load has attained homogeneity or uniformity. In a first aspect of this example, the current in-and-out sensor probe signal data obtained from the current concrete load is then matched by the processor, if for option (i), then the signal data would be compared to historic in-and-out sensor probe signal data stored in processor-accessible memory only after (i) a predetermined amount of mixer drum rotations have occurred (e.g., 5, 20, or perhaps 40 rotations); and, if for option (ii), then the signal data from the sensor probe would be compared to historic in-and-out sensor probe signal data stored in processor-accessible memory only after an automated slump monitoring system has confirmed that the concrete load has attained homogeneity or uniformity.

In a tenth example embodiment which can be based upon any of the first through ninth example embodiments above, the invention provides a method further comprising obtaining in-and-out sensor probe signal which comprises data sets of probe entry point, probe exit point, mixer drum rotation speed, and slump values, and further wherein a processor compares these data sets from a current concrete load in the mixer drum and compares to historic data of past concrete loads, with respect also to probe entry point, probe exit point, mixer drum rotation speed, and slump values.

In a first aspect of the tenth example embodiment, both the tilt angle of the mixer drum and the concrete mix design number (e.g., such as typically assigned by the batch plant where the concrete mix was provided) associated with the current load are compared to the in-and-out probe signal data and historical in-and-out probe signal data (previously stored before the current delivery) which also include historical tilt angle and mix design number, as factors to be considered by the processor in determining volume value for the concrete (or adjusting volume value as provided on a batch ticket).

In an eleventh example embodiment which can be based upon any of the first through tenth example embodiments above, the invention provides a method further comprising obtaining in-and-out sensor probe data signals which comprise data sets comprising probe entry point, probe exit point, mixer drum rotation speed, slump; wherein the processor compares these data sets obtained from a current concrete load in the mixer drum, to stored data of past concrete loads, and wherein the processor further compares mix design number and tilt angle of the current concrete load with past concrete load stored data.

In a twelfth example embodiment which can be based upon any of the first through eleventh example embodiments above, the invention provides a method wherein the processor selects historic in-and-out sensor probe data stored in memory based on mixer drum type. In other words, the processor is programed to compare data that was generated using the same mixer drum type. This can be done, for example, by storing probe data for a given concrete delivery in memory locations or employing retrieval tags that only permit the processor to include data derived from using the same manufacturer-sourced drum, or even specific model, in the volume calculations when current data is compared to historic data.

In a thirteenth example embodiment which can be based upon any of the first through twelfth example embodiments above, the invention provides a method further comprising, in addition to in-and-out signal data and the speed of mixer drum rotation, the processor further monitors slump and tilt angle of the concrete load contained in the mixer drum, and performs the calculation of the volume value calculation by accessing a database having stored values of concrete load volumes as correlated with in-and-out signal data previously obtained from sensor probes at various drum rotation speeds, at various rheological conditions, and mixer drum tilt angles, the processor being further configured to store data into the database relative to monitored in-and-out signal data, speed of mixer drum rotation, slump, tilt angle, and calculated values of concrete load volume.

In a first aspect of the thirteenth example embodiment above, the stored values of concrete load volumes correlated with in-and-out signal data, as obtained from previously concrete deliveries, are obtained from batch tickets issued in association with the concrete load components (provided that no portion of the load was discharged from the mixer drum prior to storage of the load volume value in a memory location (e.g., accessible in the cloud, remote processor location, or slump monitoring processor memory).

In a fourteenth example embodiment which can be based upon any of the first through thirteenth example embodiments above, the invention provides a method further comprising, the processor monitors, in addition to in-and-out signal data and the speed of mixer drum rotation, slump and tilt angle of the concrete load contained in the mixer drum, and performs the calculation of the volume value by accessing a database having stored values of concrete load volumes as correlated with in-and-out signal data previously obtained from sensor probes at various drum rotation speeds, at various rheological conditions, and mixer drum tilt angles, the processor being further configured to store data into the database relative to monitored in-and-out signal data, speed of mixer drum rotation, slump, tilt angle, and calculated values of concrete load volume; and further wherein drum rotation speed is within the range of 1 to 16 rotations per minute (RPM) and more preferably 1-22 rotations per minute; and further wherein slump is within the range of 0.5-10 inches, or slump flow is within the range of 10-20 inches; and wherein tilt angle of the drum is between −10 to +10 degrees departure as measured when the drum (which has a non-vertical rotational angle to begin with) is tilted such as by the delivery truck driving along upward-sloping roadway or downward-sloping roadway.

Figure 3:
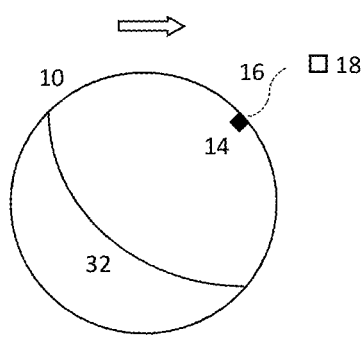
FIG. 3 is cross-sectional perspective diagram of an exemplary phenomenon wherein, at high viscosity and/or high drum rotation speed, the concrete load within a rotating mixer drum begins to exhibit concavity in the surface flow.
Figure 4:
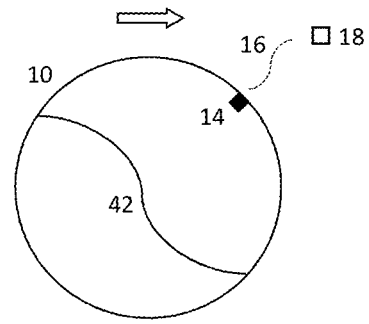
FIG. 4 is another cross-sectional perspective diagram wherein, at high viscosities and/or high drum rotation speeds, the concrete loads within a rotating mixer drum exhibits cascading in the surface flow.

In a fifteenth example embodiment which can be based upon any of the first through fourteenth example embodiments above, the invention provides a system comprising at least one sensor probe in communication with a processor programmed to perform the method according to claim 1. For example, one or more sensor probes are wirelessly connected to a processor, which is located on the delivery truck (outside of the mixer drum), on the mixer drum hatch door, in the truck cabin or on the truck frame; or at a remote location such as a dispatch or control center (See FIGS. 3 and 4).

In a sixteenth example embodiment, which can be based upon any of the first through fourteenth example embodiments, the invention provides a method or system wherein the processor is programmed to determine concrete load volume values after each of at least two different discharge events from the same concrete load. The present inventors believe that until the present invention, there has not been an accurate way to use sensor probes to measure volume values after successive discharge events from the same mixer drum load. In further aspects based on this example, the method further comprises issuing a delivery ticket for each volume partial discharge from the original load volume in the mixer drum (which can be loaded to a maximum volume of typically 12 cubic yards).

In a seventeenth example embodiment, which can be based upon any of the first through sixteenth example embodiments above, the invention provides a method and/or system comprising a processor that is configured to perform any of the methods described in the above example embodiments, wherein the processor is wirelessly connected to at least one sensor probe chosen from force sensor, a contact type switch, acoustic transducer, or combination thereof. For example, the force sensor could be of the type disclosed in any of U.S. Pat. No. 9,199,391 (Beaupre et al.), U.S. Pat. No. 9,625,891 (Berman), U.S. Pat. No. 10,041,928 (Berman), or WO 2019/040562A1 (Biesak et al.). A preferred combination could include a force sensor and a contact type switch; and, more preferably, both of these types of sensors can be mounted on a drum hatch or on the same frame or structure within the drum.

While the invention is described herein using a limited number of example embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

EXEMPLIFICATIONS

Example 1

To illustrate the effect of different parameters on the concrete surface shape within a rotating drum, the present inventors constructed a simplified model based on Zik et al.

(1994), where the surface of a granular material was described by the following equation:

$$-\left(\frac{k^2+k}{2k+1}\right)\left(\frac{\rho g}{\eta}\right)^{\frac{1}{k}}\left(\frac{p_0}{\rho g}\right)^{\frac{1}{k}+2}\left(\frac{2}{\omega}\right)\left[\left(\frac{dy}{dx}-\mu\right)^{\frac{1}{k}}\left(1+\left(\frac{dy}{dx}\right)^2\right)\right] = R^2 - (x^2 + y^2)$$

where for Zik et al., k represents a constant to account for motion of granular particles within a Newtonian fluids; ρ represents the density of the material; g represents gravity; η represents apparent viscosity of the flowing layer; $p_0$ represents the pressure exerted by the flowing layer; ω represents the rotational speed of the drum; dy/dx represents the slope of the surface; μ represents the internal friction between the granular particles in the flowing layer, R represents the radius of the rotating drum, and x and y represent the location of the surface in Cartesian coordinates.

Figure 5:
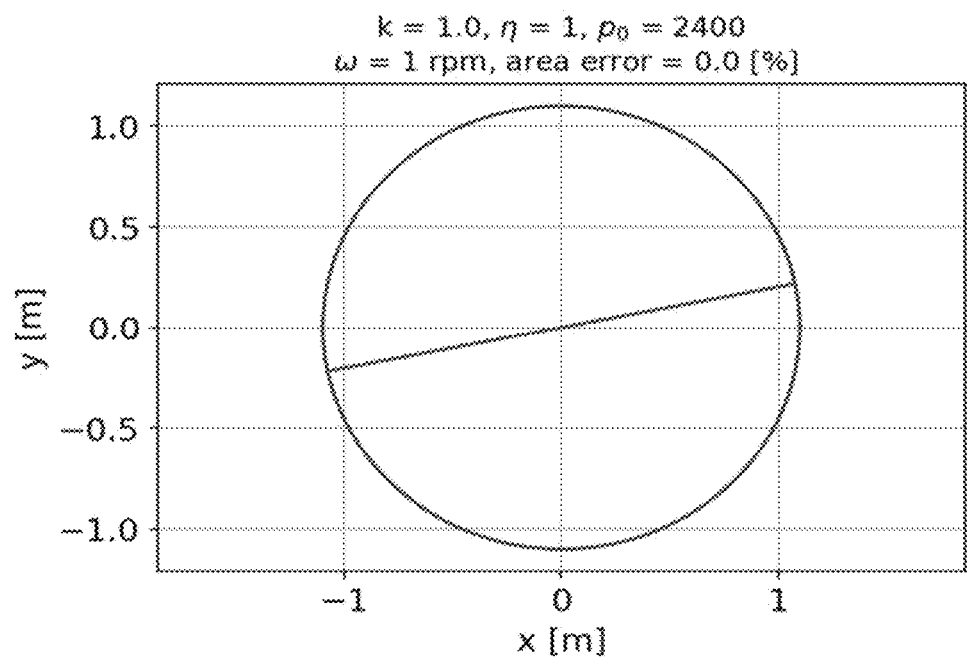
FIG. 5 is a cross-sectional perspective diagram the results from solving the equation of Example 1 assuming Newtonian fluid behavior with low viscosity and low drum speed.

The foregoing equation can be solved numerically to produce surfaces with different parameters at different filling values (e.g. 50% full). In the first example, k=1; ρ=2400 kg/m³; g=9.81 m/s²; η=1.0 Pa-s; $p_0$=2400 Pa; ω=1 rpm; μ=0.2, R=1.1 m, and the surface at x=0 is 0 (corresponding to 50% area filling). The condition that at x=0, the surface (y)=0 provides the initial condition to solve the differential equation. These parameters roughly approximate a concrete with low viscosity in a drum rotating slowly. As illustrated in FIG. 5, the surface of the concrete (dark solid line) as well as a dotted line illustrate near the inner wall of the drum where a sensor would detect an entrance and exit. An error in the area measurement based on the perceived surface (as determined by the sensor), and the actual surface was calculated.

Thus, in FIG. 5, low viscosity concrete and slowly rotating drum lead to a relatively flat surface flow shape as expected (here shown rotating in counter-clockwise direction). Furthermore, the error in the area measurement is zero as both lines overlap.

Figure 6:
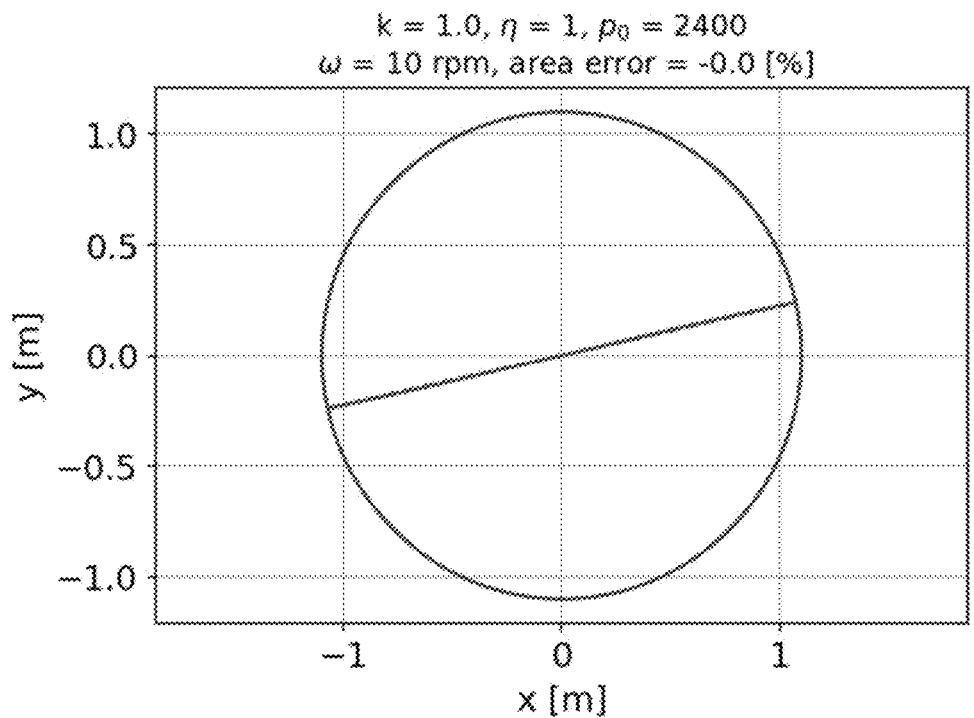
FIG. 6 is a cross-sectional perspective diagram illustrating the results from solving the equation of Example 1 which assumes Newtonian fluid behavior with low viscosity and moderate drum speed.

However, as the speed of the mixer drum increases, the flow surface of the concrete becomes steeper, as shown in FIG. 6. Because viscosity (e.g., slump) of the concrete is still relatively low, the surface flow is still relatively flat, although the dotted line in FIG. 6, which represents a straight line between the entrance and exit points of the probe in the concrete, is now slightly or barely visible.

Figure 7:
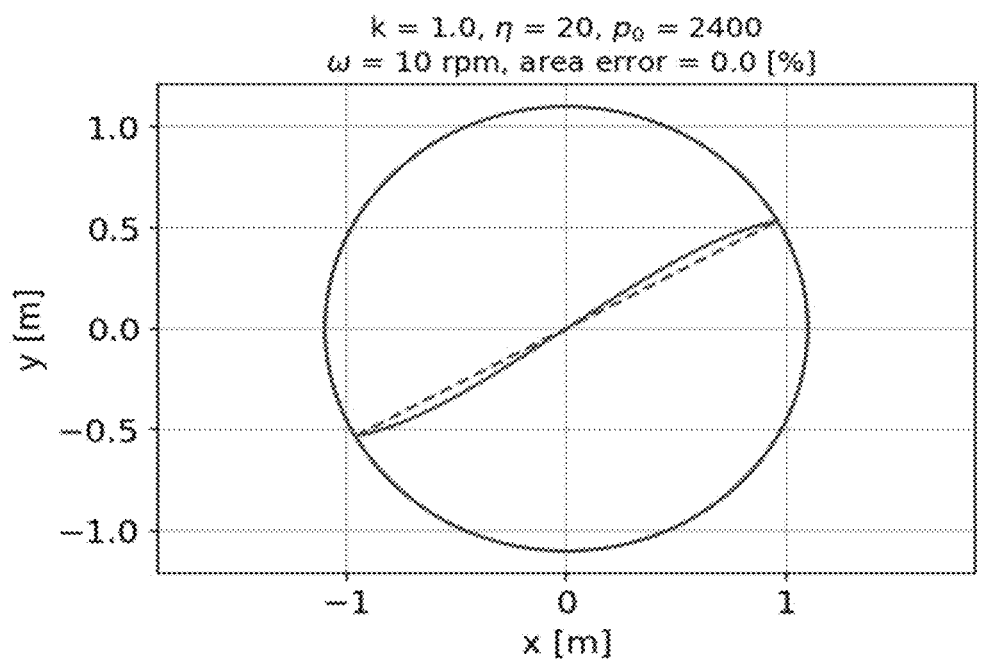
FIG. 7 is a cross-sectional perspective diagram illustrating the results from solving the equation of Example 1 assuming Newtonian fluid behavior with high viscosity and moderate drum speed (where surface flow displays "S" shape phenomena)

With increasing viscosity, the shape begins to become nonlinear, as shown in FIG. 7. In all three cases illustrated in FIGS. 5-7, the error in volume measurement is negligible, as the departure from linearity was relatively even at both ends of the dotted line. In other words, any positive error on one side of the drum is offset by a negative error on the other side, resulting in a negligible error.

Example 2

Theoretical consideration of the graphic results will confirm further that concrete mixes can demonstrate flow behavior more akin to granular material rather than that of a Newtonian fluid (e.g. the shear-stress within the fluid is linearly proportional to the strain-rate). The equation of Example 1 was resolved numerically with k=0.5, which represents a shear-thinning material. Concrete is widely known as a shear-thinning material (e.g. the viscosity decreases under increasing shear-strain). Furthermore, the internal friction of the material is not constant within the concrete. In particular, the internal friction decreases where the material is already moving (i.e. a static versus dynamic friction coefficient). In the case of cascading surfaces, material is already moving in the lower parts of the drum (x<0).

Figure 8:
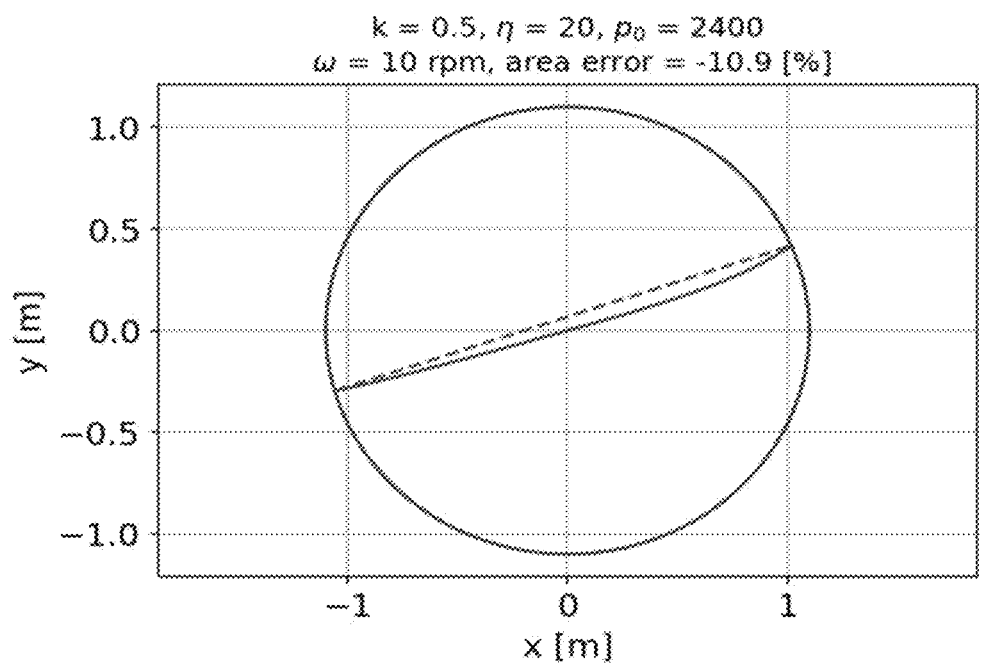
FIG. 8 is a cross-sectional perspective diagram illustrating the results from solving the equation of Example 1 assuming Newtonian fluid behavior with high viscosity and moderate drum speed (where surface flow displays concave shape)

As illustrated in FIG. 8, the dynamic friction coefficient remained 0.2 while the static friction coefficient was increased to 0.9. In other words, when the concrete is not moving, it takes more force to move as compared to when the concrete is already moving. The relationship between the friction coefficients will be material dependent. The changes to the model suggest that an asymmetrical convex surface flow can arise, leading to substantial errors in concrete volume calculation based solely on entry and exit points.

Example 3

Figure 9:
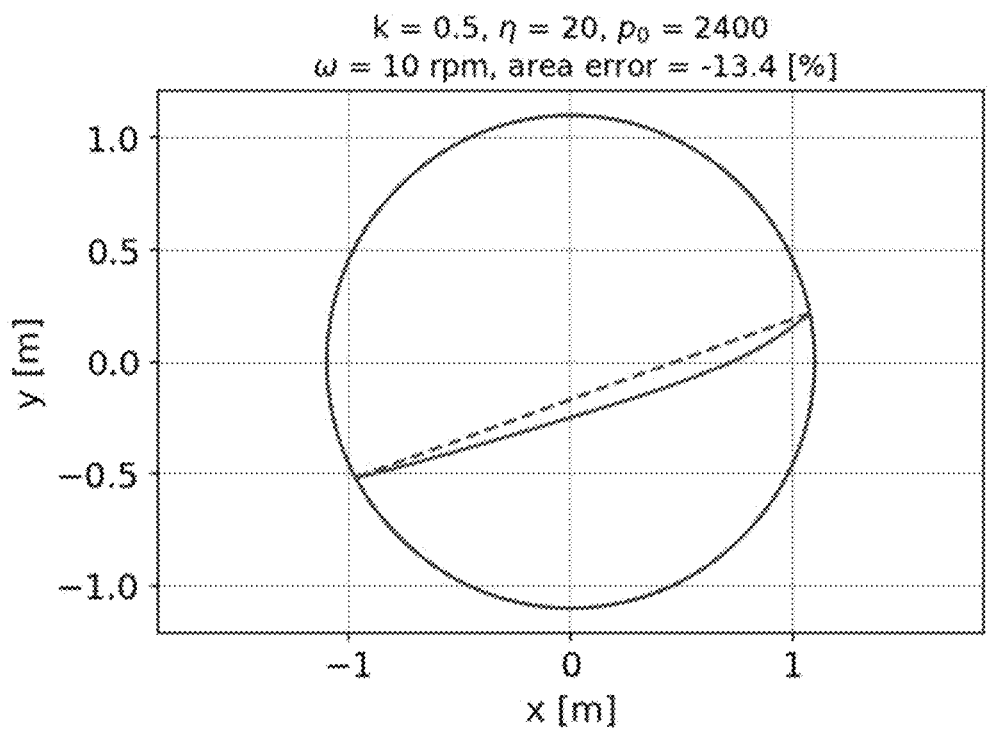
FIG. 9 is a cross-sectional perspective diagram illustrating the results from solving the equation of Example 1 assuming Newtonian fluid behavior with high viscosity and moderate drum speed (where surface flow displays convex shape)

This example confirms that highly asymmetrical effects in surface flow of the concrete load within the rotating mixer drum can be amplified where fill level of concrete does not exceed 50% of the mixer drum capacity. To model this case, the initial condition for the differential equation is adjusted so that at x=0, the surface (y)=−0.25 (i.e. less than zero), as illustrated in FIG. 9. This suggests that volume calculation of the concrete load contained in the drum could be incorrect by as much as ten percent (10%). In other words, for a ten cubic hard load of concrete, a system processor that was programmed to calculate volume based on entry and exit points of a probe could be off by as much as one cubic yard of concrete.

Based on these examples, the present inventors believe that a number of factors can affect the shape of the flow surface of the concrete, such that the volume of concrete load actually contained within the rotating drum could deviate significantly from theoretical volume (see dotted line corresponding to entrance and exit points in FIG. 8). If errors were constant, then there would be little to worry about. However, the present inventors realized that errors can vary in nature and extent from one mix design to another mix design; and from truck to truck; and from one drum speed to another drum speed; and even from concrete volume to another concrete volume.

The present inventors further believe that if one were to use empirical methods to calibrate volume determination based on, for example, ten different concrete mix designs, at four different rheology levels (e.g., different slumps), at four different volume levels, using three mixer trucks, and using only one concrete manufacturer; then this would mean that 480 different standard measurements would have to be done just for the one concrete manufacturer (e.g., 10×4×4×3=480).

Thus, in the exemplary methods and systems of the present invention, the present inventors prefer to calibrate their load volume determinations using data collected over time. In other words, this involves using a processor to collect data that includes: submergence state of the sensor probe and other potentially relevant factors such as rheology (e.g., slump), the concrete mix design, and the original or actual beginning volume of the concrete load (as originally batched and placed into the ready-mix delivery truck at the batch plant). Preferably, this data collection is done before concrete is removed from the drum to establish an initial data set regarding typical drum loads.

Examples 4-9

For Examples 4-9, data was collected using a ready-mix concrete delivery truck and force type sensor mounted on the inner wall of the mixer drum, and this data was analyzed to determine volume and the accuracy with which this was being determined. Twenty-five concrete loads were produced at a variety of load size volumes (e.g., 2, 4, 7, 10 cubic yards) resulting in 97 data points. For each load, the submergence/un-submergence ratio (i.e. the percentage of a drum revolution where the sensor was submerged) was recorded from the force sensor. In addition, the tilt of the truck (which is the angle of the rotational axis of the drum with respect to horizontal or level ground), the cement content (i.e., the concrete mix design), the slump of the concrete, and the air content of the concrete load were recorded.

Initial volume was based on the initial batch report from the concrete batching plant. Subsequent volume determinations of the concrete were made by measuring the volume of concrete discharged from the concrete mixer drum into wheel barrows of known volume.

Tests were performed on the wheel barrows of concrete to determine relevant parameters such as the slump, and air content according to their respective ASTM methods.

The tilt of the truck (along the rotational axis of the mixer drum) was determined using an inclinometer on the truck, but could be determined using an accelerometer (preferably three-axis type) attached to the rotating drum.

Example 4

Figure 10:
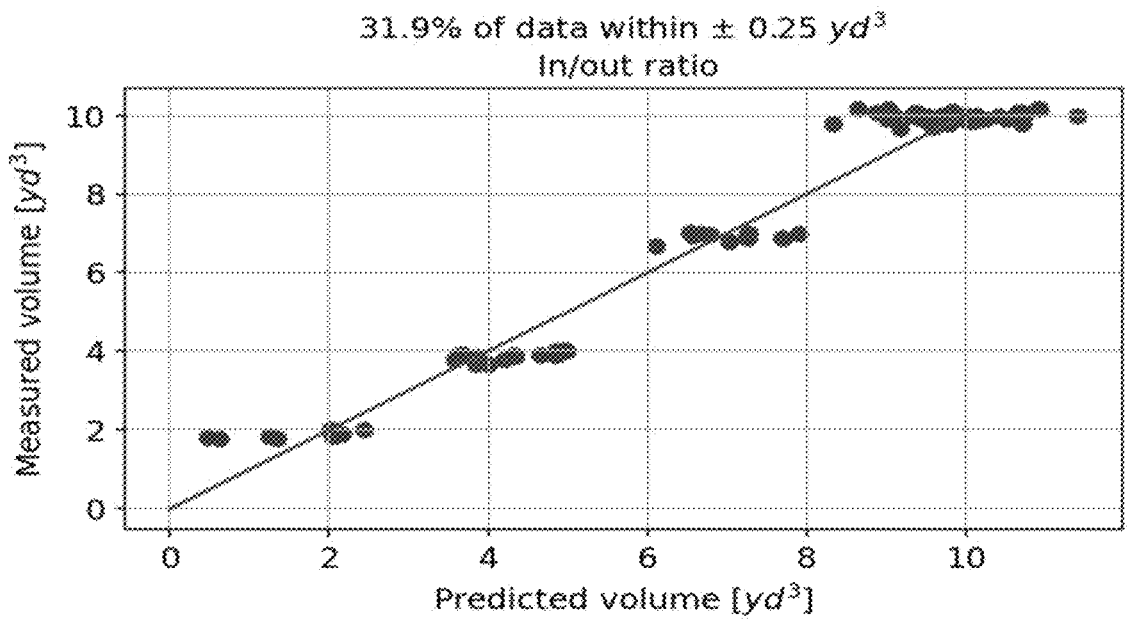
FIG. 10 is a graph showing the relation between predicted volume and the measured volume for 97 comparative measurements wherein the prediction is solely based on in-and-out sensor measurement, without considering rheology (e.g., slump)

The relative accuracy of concrete volume determination, as conducted using submergence/non-submergence ratio data as sensed by the probe, was assessed by comparing the data with measured volume numbers, as graphically shown in FIG. 10. A linear regression analysis was performed using the submergence/non-submergence (in-and-out) ratio as the predictor variable. Only linear terms were considered (e.g. in-and-out ratio, but not the square of the in-and-out ratio). The measured volume numbers were obtained according to the batching facility where the materials are weighed accurately. The percentage of predictions within 0.25 cubic yards of the actual volume measurement was determined to be nearly 32% for this example. Thus, for this dataset, around 68% of the predictions based solely on the in-and-out ratio would not meet sufficient accuracy as required by standards such as ASTM C1792-14. In other words, the in-and-out ratio was not deemed by the present inventors to be sufficient to develop a robust model for the 25 loads, and so the inventors considered other factors. The cross-validation score was determined by using a standard cross validation of the regression method, using a "K-fold" of 5. In other words, the dataset was split into 5 groups where each group is used as a validation set based on models created from the other 4 groups. The present inventors believed that the predictions within each load size group (e.g. 2, 4, 7, 10 cubic yards) are inaccurate due likely to the complex flow surfaces in the concrete generated by several factors (e.g., the slump of the concrete, the tilt (i.e. the angle between the rotational axis of the mixer drum and horizontal) of the concrete truck, the air content, the cement content, etc.). The present inventors also realized that these inaccuracies occur even at a low drum speed of 2 RPM (revolutions per minute) which is all too frequently encountered in the industry. The solid line represents the line of equivalence (i.e. predicted equals measured).

Example 5

Figure 11:
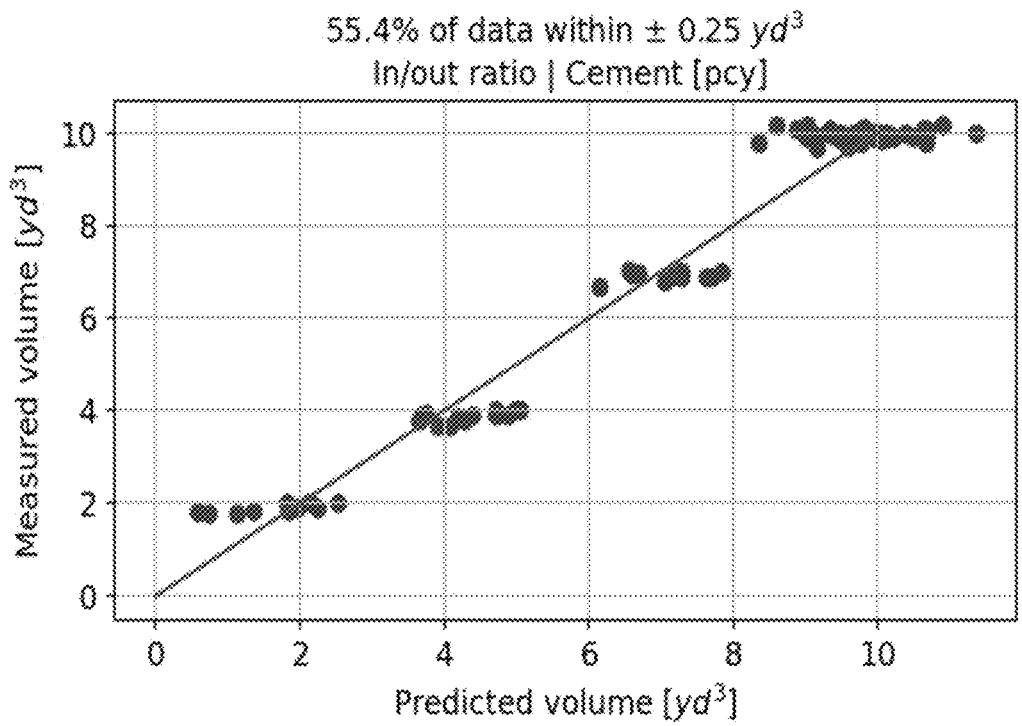
FIG. 11 is a graph showing the combined relation between predicted volume and the measured volume for 97 comparative measurements wherein the linear prediction is based on in-and-out sensor measurements for three different cement contents.

In this example, the present inventors considered that the center of a flowable mass (e.g., Examples 1-3) could change depending upon rheology of the material, and that the amount of cement within the concrete mix could exert a non-linear change in rheological behavior. As illustrated by the data graphically displayed in FIG. 11, they did a linear regression analysis using the entry/exit data (reflected as a ratio of submergence/non-submergence) for each of three different groups of cement content (e.g. 423, 611 and 752 pounds per cubic yard (pcy)). Within each group, a linear regression analysis was performed similar to Example 4. FIG. 11 shows the combined measured versus predicted volumes with their respective linear models. Although the cross-validation score improved by 23.5 percentage points as shown in FIG. 11, the present inventors believed that a model could be improved in terms of accuracy.

Example 6

Figure 12:
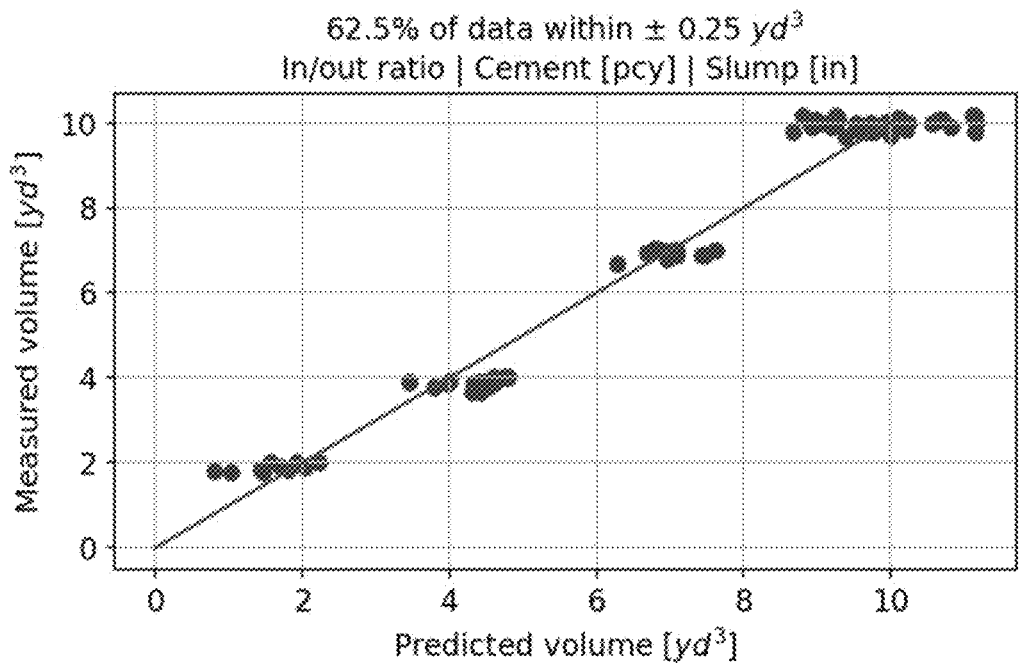
FIG. 12 is a graph showing the relation between predicted volume and the measured volume for 97 comparative measurements wherein the linear prediction is based on in-and-out sensor measurement and slump, for three different cement contents.

In this example, the present inventors performed a linear regression analysis which included the in-and-out ratio as well as concrete slump (measured according to ASTM C143/143M-15a) as predictor variables for three different cement contents. They also included an interaction term (i.e., between the slump and the in-and-out ratio). In this case, they found that the cross-validation score was improved by an additional 7.1 percentage points, as shown in FIG. 12. The present inventors believed that overall accuracy could be improved even further.

Example 7

Figure 13:
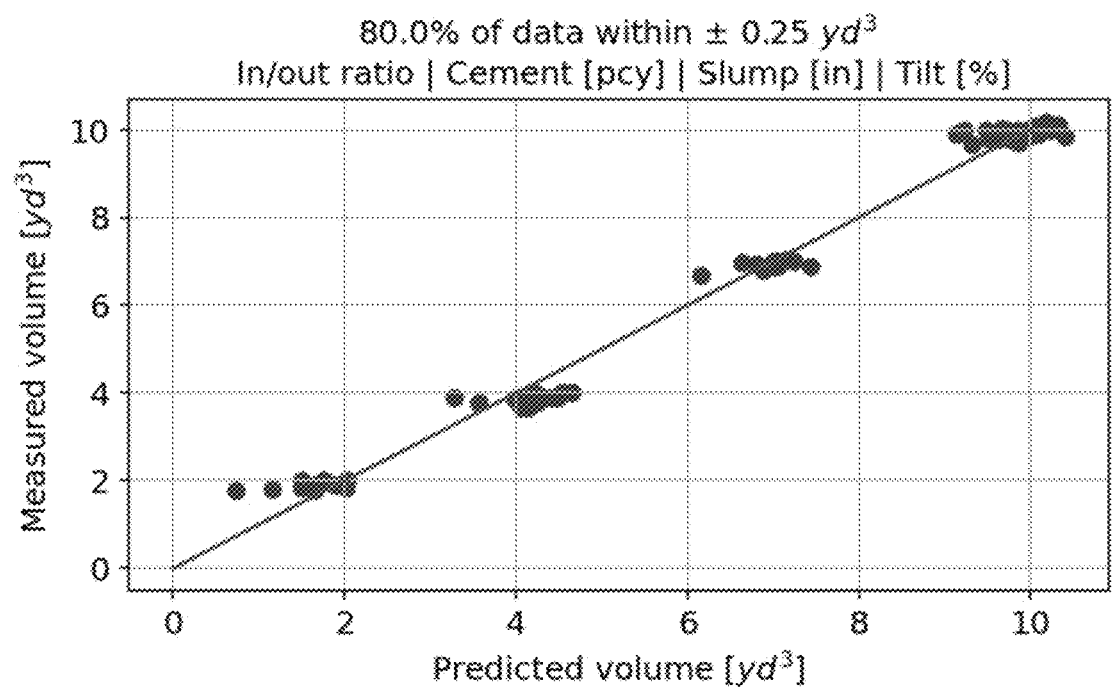
FIG. 13 is a graph showing the relation between predicted volume and the measured volume for 97 comparative measurements wherein the linear prediction is based on in-and-out sensor measurement, slump, and tilt of the delivery truck along rotational axis of the mixer drum, for three different cement contents.

In this example, the present inventors considered that the tilt of the truck (along the rotational axis of the mixer drum) could adversely affect the volume determination. In this example, the present inventors performed a linear regression which included as predictor variables the in-and-out ratio, the slump as well as the tilt within each cement content group. The tilt was obtained using an inclinometer mounted on the truck frame (rather than the mixer drum). An interaction term was also included. For this particular data set, the present inventors found that tilt factor provided an additional 17.5 percentage point increase in the cross-validation score; and this can be visually appreciated by referring to FIG. 13.

Example 8

Figure 14:
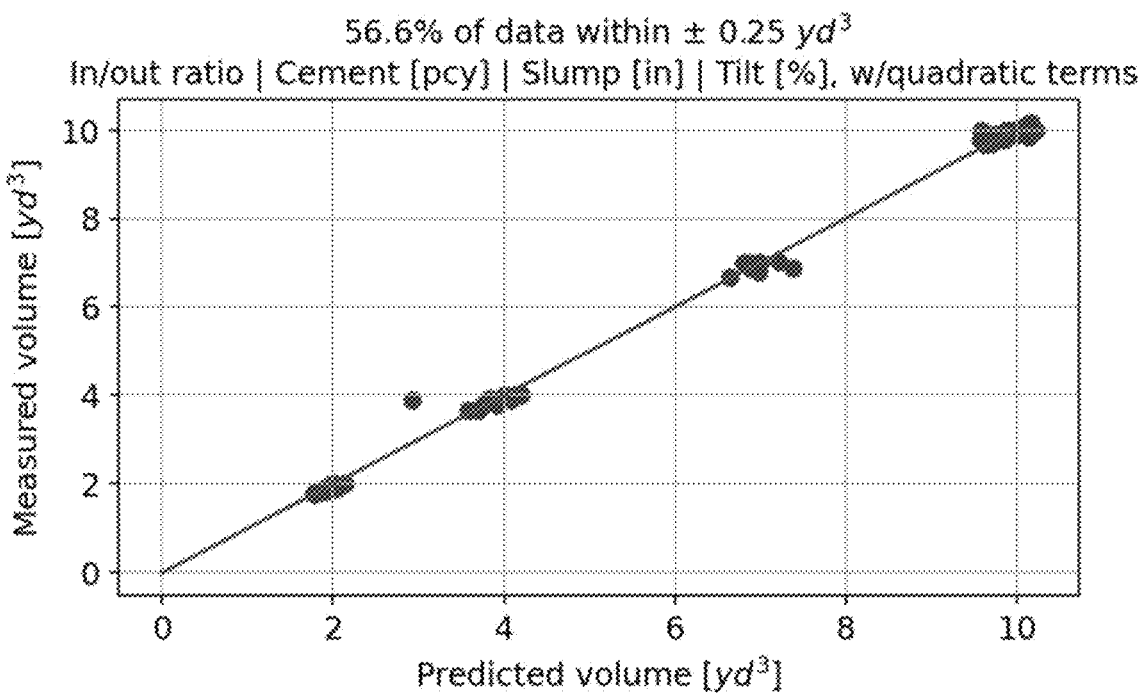
FIG. 14 is a graph showing the relation between predicted volume and the measured volume for 97 comparative measurements wherein the prediction is obtained from a linear regression analysis incorporating both linear and quadratic terms based on in-and-out sensor probe measurements, slump, and tilt of the delivery truck along the rotational axis of the mixer, for three different cement contents.

In this example, the present inventors applied models using quadratic and cubic terms, including interaction terms for the same parameters of Example 7 (e.g. in-and-out ratio, slump, tilt for each cement group). The results of the cubic model are shown in FIG. 14. Although the predicted points are closer to the line, the cross-validation score decreased by 23.4 percentage points—indicating overfitting of the data. Although this kind of prediction is relatively good for this exact set of data, the prediction is likely to be less accurate when encountering new data (e.g. new loads of concrete with slightly different slumps, tilts, etc.). The present inventors saw a similar effect when making modeling predictions that employed quadratic factors.

Example 9

Figure 15:
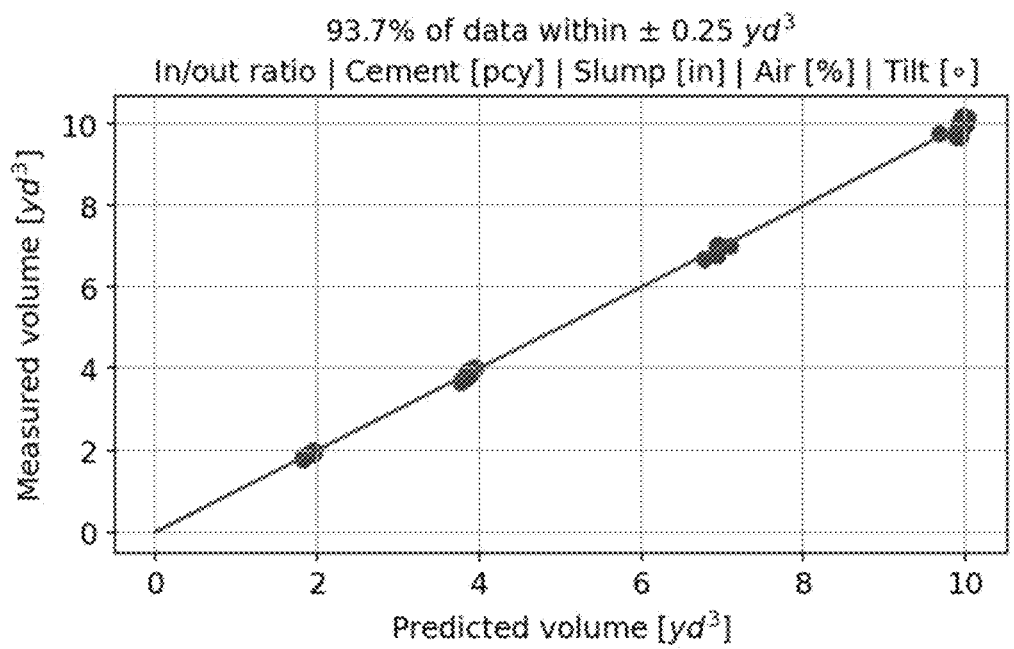
FIG. 15 is a graph showing the relation between predicted volume and the measured volume for 97 comparative measurements wherein the prediction is obtained from a random forest regression analysis based on in-and-out sensor probe measurements, slump, and tilt of the delivery truck along the rotational axis of the mixer, for three different cement contents.
Figure 16:
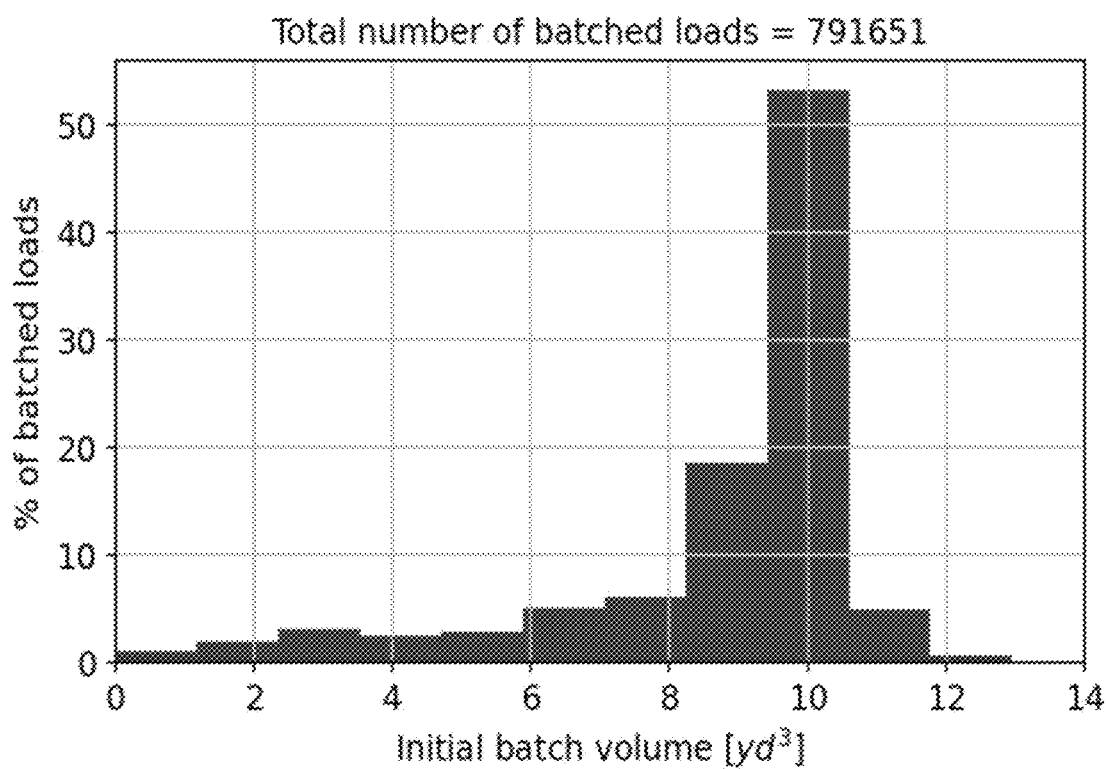
FIG. 16 is a histogram showing an example distribution of potential calibration volumes for over 700,000 loads of concrete.

The present inventors used the same parameters as predictor variables along with the interaction terms in the following example, except that they applied a random forest regression machine learning method. A random forest regression is an ensemble learning method that operates by constructing a number of decision trees (in this case 500), and outputting the mean prediction of each individual tree. Decision trees were limited to have a maximum depth of 3 decisions in order to reduce the chance of overfitting. The cross-validation score in this case was above 95% and is illustrated in FIG. 16. The present inventors confirmed their belief that, if in-and-out ratio is only used, the cross-validation score drops to below 89%, as shown in FIG. 15. Thus, the present inventors believe that accuracy of volume prediction might be increased when regression analysis and relevant parameters (e.g. slump, tilt) are included in the analytical model.

Example 10

The present inventors provide a histogram in FIG. 16 to suggest the potential available volume calibration data that can be obtained, as illustrated by the exemplary methods discussed above. Although a majority of concrete load volumes are about 9-10 cubic yards, the present inventors believe that significant data can be obtained with various load sizes. As time progresses, more data is generated and thus available for use in calibration methods, such as in the examples described above.

The foregoing examples and embodiments were present for illustrative purposes only and not intended to limit the scope of the invention.

It is claimed:

1. A method for determining volume of a concrete load contained within a rotatable mixer drum, comprising:
    (A) rotating a concrete load contained within a rotatable mixer drum having an inner wall, having a non-vertical axis of rotation, and having at least one sensor probe mounted on or along the inner wall and configured to transmit in-and-out signal data from the at least one sensor probe when the at least one sensor probe is rotated through the contained concrete load within the rotatable mixer drum, the in-and-out signal data comprising sensor probe submergence and non-submergence intervals and sensor probe entry angle and exit angle, and transmitting the sensor probe in-and-out signal data to a processor configured to receive the in-and-out signal data and to calculate a value corresponding to volume of the concrete load contained within the rotatable mixer drum;
    (B) the processor performing the volume value calculation by accessing a database having stored values of concrete load volumes as correlated with in-and-out signal data previously obtained from sensor probes used in calculating load volumes of prior concrete loads previously contained within a rotatable mixer drum; and
    (C) performing, based on the volume value calculation, at least one function chosen from (i) administering a dosage of water or admixture into the concrete load, (ii) expelling a volume of concrete from the rotatable mixer drum, (iii) providing an indication of the administered dosage of water or admixture into the concrete load, expelled volume of concrete, or both; and (iv) performing a combination of any of the foregoing functions (i)-(iii); and the method further comprising
    (D) monitoring rheology of the concrete load contained in the rotatable mixer drum, monitoring tilt angle of the rotatable mixer drum, and calculating the volume value by accessing a database having stored values of previous concrete load volume values as correlated with in-and-out signal data previously obtained from sensor probes at various drum rotation speeds, at various rheological conditions, and at various rotatable mixer drum tilt angles.

2. The method of claim 1 wherein, in step (A), the calculation of the volume value of the concrete load contained in the rotatable mixer drum comprises adjustment of a concrete load volume value as included in or on a batch ticket issued by a batch plant.

3. The method of claim 1 wherein the rotatable mixer drum is mounted on a ready-mix concrete delivery truck.

4. The method of claim 1 wherein the slump value of a current concrete load contained in the rotatable mixer drum is monitored by an automatic slump monitoring system wherein the slump value is derived using a force sensor, hydraulic pressure sensor, or combination thereof.

5. The method of claim 1 wherein the at least one sensor probe is a contact switch.

6. The method of claim 1 further comprising providing at least one hydraulic pressure sensor for monitoring hydraulic pressure required to rotate the rotatable mixer drum at a given mixer drum rotation speed and obtaining an indication of slump, slump flow, or other rheology characteristic of the current concrete load contained in the rotatable mixer drum; and employing the at least one sensor probe mounted on or along the inner wall of the rotatable mixer drum and configured to transmit in-and-out signal data corresponding to the current concrete load contained in the rotatable mixer drum and to calculate a volume value for a given drum rotation speed, and comparing the indication of slump, slump flow, or other rheology characteristic of the current concrete load to historic signal data in which in-and-out signal data was stored in correlation with calculated slump, slump flow, or other rheology characteristic at various mixer drum rotation speeds as derived from prior concrete mix loads.

7. The method of claim 1 wherein said at least one sensor probe comprises a force probe and a contact switch, both of which are mounted on a rotatable mixer drum hatch door.

8. The method of claim 7 wherein both the force probe and the contact switch can provide in-and-out signal data to the processor and be compared to ascertain whether the force probe may have inaccuracies due to variations in the length of the force probe which affect calculations of its points of entry into and exit from the surface of the concrete load.

9. The method of claim 1 wherein the in-and-out signal data obtained from the current concrete load contained in the rotatable mixer drum is used by the processor only after (i) a predetermined amount of mixer drum rotations have occurred or (ii) an automated slump monitoring system has confirmed that the current concrete load has attained homogeneity or uniformity.

10. The method of claim 1 further comprising obtaining an in-and-out sensor probe signal which comprises data sets of sensor probe entry point, sensor probe exit point, mixer drum rotation speed, and slump values, and further wherein the processor compares these data sets from a current concrete load in the rotatable mixer drum and compares to historic data of past concrete loads previously contained within a rotatable mixer drum.

11. The method of claim 1 further comprising obtaining in-and-out sensor probe data signals which comprise data sets comprising probe entry point, probe exit point, mixer drum rotation speed, and slump values; wherein the processor compares these data sets obtained from a current concrete load in the rotatable mixer drum, to stored data of past concrete loads previously contained within a rotatable mixer drum, and wherein the processor further compares mix design number and tilt angle of the current concrete load with past concrete load stored data.

12. The method of claim 1 wherein the processor selects historic in-and-out sensor probe data stored in memory based on rotatable mixer drum type.

13. The method of claim 1 further comprising monitoring slump and tilt angle of the concrete load contained in the rotatable mixer drum, and performing the calculation of the volume value calculation by accessing a database having stored values of concrete load volumes as correlated with in-and-out signal data previously obtained from sensor probes at various rotatable mixer drum rotation speeds, at various rheological conditions, and various rotatable mixer drum tilt angles, the processor being further configured to store data into the database relative to monitored in-and-out signal data, speed of rotatable mixer drum rotation, slump, tilt angle, and calculated values of concrete load volume.

14. The method of claim 1 further comprising monitoring slump and tilt angle of the concrete load contained in the rotatable mixer drum, and calculating volume value by accessing a database having stored values of concrete load volumes as correlated with in-and-out signal data previously obtained from sensor probes at various rotatable mixer drum rotation speeds, at various rheological conditions, and rotatable mixer drum tilt angles, the processor being further configured to store data into the database relative to monitored in-and-out signal data, speed of rotatable mixer drum rotation, slump, tilt angle, and calculated values of concrete load volume; and further wherein rotatable mixer drum rotation speed is within the range of 1-22 rotations per minute; wherein slump or slump flow is within the range of 0.5-20 inches; and wherein the rotatable mixer drum is mounted on a delivery truck and the non-vertical axis of rotation of the rotatable mixer drum has a tilt angle between (−)10 degrees to (+)10 degrees departure on account of the delivery truck driving along sloping roadway.

15. A system comprising at least one sensor probe configured to transmit in-and-out signal data when rotated through a concrete load contained in a rotatable mixer drum according to step (A) of claim 1, the at least one sensor probe in communication with a processor programmed to perform steps (B) through (D) of claim 1.

\* \* \* \* \*